US012316176B2

(12) United States Patent
Li

(10) Patent No.: US 12,316,176 B2
(45) Date of Patent: May 27, 2025

(54) METHOD FOR EXTERNAL WINDING OF ESP MOTOR USING A SPLIT CORE STATOR

(71) Applicant: Baker Hughes Oilfield Operations LLC, Houston, TX (US)

(72) Inventor: Yong Li, Owasso, OK (US)

(73) Assignee: Baker Hughes Oilfield Operations LLC, Houston, TX (US)

(*) Notice: Subject to any disclaimer, the term of this patent is extended or adjusted under 35 U.S.C. 154(b) by 0 days.

(21) Appl. No.: 17/529,013

(22) Filed: Nov. 17, 2021

(65) Prior Publication Data
US 2023/0155463 A1    May 18, 2023

(51) Int. Cl.
| | | |
|---|---|---|
| *H02K 15/085* | (2006.01) |
| *E21B 43/12* | (2006.01) |
| *F04D 13/08* | (2006.01) |
| *H02K 5/132* | (2006.01) |

(Continued)

(52) U.S. Cl.
CPC .......... *H02K 15/085* (2013.01); *F04D 13/08* (2013.01); *H02K 15/021* (2025.01); *E21B 43/128* (2013.01); *H02K 5/132* (2013.01)

(58) Field of Classification Search
CPC .... H02K 15/085; H02K 15/024; H02K 5/132; F04D 13/08
See application file for complete search history.

(56) References Cited

U.S. PATENT DOCUMENTS 3,913,220 A * 10/1975 Miller .................... H02K 23/26
                                                      29/598
3,942,246 A *  3/1976 Wilding ................. H02K 15/09
                                                      29/733

(Continued)

FOREIGN PATENT DOCUMENTS

| IT | 0526819 A2 * | 2/1993 |
| JP | 2004-088930 A | 3/2004 |
| KR | 10-0642704 B1 | 11/2006 |

OTHER PUBLICATIONS

Rai et.al., Design and Development of Energy Efficient Induction Motor for Solar PV fed Submersible Water Pump, 2020 3rd International Conference on Energy, Power and Environment: Towards Clean Energy Technologies, 2021. (Year: 2021).*

(Continued)

*Primary Examiner* — Aneeta Yodichkas
*Assistant Examiner* — Jose K Abraham
(74) *Attorney, Agent, or Firm* — Sprinkle IP Law Group

(57) ABSTRACT

Systems and methods for manufacturing stators for electric submersible pumps, where a stator core having an inner portion and an outer portion is formed. The inner portion has a plurality of teeth and outward-facing slots. Magnet wire coils are formed on the inner portion by holding the inner portion in a stationary position and using a linearly movable robotic arm to position the magnet wire in each slot while preventing the wire from sliding axially with respect to the stator and adjacent turns of the coil. After forming the magnet wire coils on the inner portion of the stator core, the outer portion of the stator core is press-fit onto the inner portion to close the slots. The magnet wire can thereby be positioned to maximize the fill factor of each slot and increase power density for a given temperature rise.

15 Claims, 6 Drawing Sheets

(51) Int. Cl.
*H02K 15/02* (2025.01)
*H02K 15/021* (2025.01)

(56) References Cited

U.S. PATENT DOCUMENTS

| | | | | |
|---|---|---|---|---|
| 3,995,785 | A * | 12/1976 | Arick | H02K 15/085 |
| | | | | 242/432.4 |
| 4,724,600 | A * | 2/1988 | Studniarz | H02K 3/32 |
| | | | | 310/215 |
| 4,765,551 | A * | 8/1988 | Page | H02K 15/09 |
| | | | | 242/433.4 |
| 4,852,245 | A * | 8/1989 | Denk | H02K 3/47 |
| | | | | 29/606 |
| 5,025,997 | A * | 6/1991 | Shi | H02K 15/085 |
| | | | | 242/432.6 |
| 5,369,877 | A * | 12/1994 | Lombardi | H01R 39/32 |
| | | | | 29/736 |
| 5,413,289 | A * | 5/1995 | Santandrea | H02K 15/09 |
| | | | | 242/433.1 |
| 6,036,135 | A * | 3/2000 | Ulrich | H02K 15/085 |
| | | | | 242/433.1 |
| 6,170,974 | B1 * | 1/2001 | Hyypio | H02K 3/28 |
| | | | | 310/179 |
| 6,304,018 | B1 | 10/2001 | Ham | |
| 6,439,497 | B1 * | 8/2002 | Backlund | H02K 15/085 |
| | | | | 310/179 |
| 6,483,221 | B1 | 11/2002 | Pawellek | |
| 6,935,011 | B2 * | 8/2005 | Shiah | H02K 15/022 |
| | | | | 310/43 |
| 7,550,892 | B2 | 6/2009 | Hsu | |
| 7,701,106 | B2 * | 4/2010 | Yuratich | H02K 1/185 |
| | | | | 310/216.069 |
| 8,692,115 | B2 * | 4/2014 | Rumbaugh | F04D 29/026 |
| | | | | 174/105 R |
| 9,130,436 | B2 * | 9/2015 | Ponzio | H02K 15/095 |
| 9,472,987 | B1 * | 10/2016 | Hall | H02K 3/12 |
| 2005/0061906 | A1 * | 3/2005 | Burch | H02K 15/085 |
| | | | | 242/432 |
| 2007/0096571 | A1 * | 5/2007 | Yuratich | H02K 9/00 |
| | | | | 310/90 |
| 2008/0017746 | A1 * | 1/2008 | Jones | H02K 15/085 |
| | | | | 242/432 |
| 2009/0013520 | A1 * | 1/2009 | Noji | H02K 15/085 |
| | | | | 29/605 |
| 2009/0189477 | A1 * | 7/2009 | Yamamoto | H02K 1/148 |
| | | | | 310/216.058 |
| 2012/0063931 | A1 * | 3/2012 | Rumbaugh | H02K 3/34 |
| | | | | 417/410.1 |
| 2012/0275942 | A1 * | 11/2012 | Knapp | H02K 1/165 |
| | | | | 310/216.086 |
| 2016/0036277 | A1 * | 2/2016 | Lynch | H02K 3/345 |
| | | | | 264/104 |
| 2017/0126077 | A1 * | 5/2017 | Torrey | H02K 1/16 |
| 2017/0324314 | A1 * | 11/2017 | Schoendeling | H02K 3/28 |
| 2020/0161912 | A1 * | 5/2020 | Klassen | H02K 1/2791 |
| 2021/0226484 | A1 | 7/2021 | Torrey | |

OTHER PUBLICATIONS

International Search Report and Written Opinion for International Application No. PCT/US2022/050292, mailed Apr. 4, 2023, 11 pgs.
International Preliminary Report on Patentability issued by the U.S. Patent and Trademark Office for PCT Application No. PCT/US2022/050292, mailed May 2, 2024, 6 pages.

* cited by examiner

METHOD FOR EXTERNAL WINDING OF ESP MOTOR USING A SPLIT CORE STATOR

BACKGROUND

Field of the Invention

The invention relates generally to electric motors, and more particularly to systems and methods for constructing motors such as may be for electric submersible pumps (ESPs) that are installed downhole in wells.

Related Art

For electric submersible pumps (ESP's), high power density is always desirable. Higher power density motors can be made with reduced length, weight and cost in comparison to lower power density motors having the same power rating. By making the ESP motor and system lighter and shorter, installation of the ESP system can be made easier. Additionally, the availability of a lighter and shorter motor can enable alternative deployment options and make it easier for the ESP to reach the "sweet spot" of a production zone.

In ESP motors, particularly closed slot designs which are very long (e.g., 30 feet), the process of winding magnet wire on the motor's stator is difficult. It is particularly difficult to achieve a high fill factor in the stator slots (i.e., the amount of wire that is positioned in the slots) and to thereby achieve the desired high power density in the motor. Existing techniques for both machine winding and manual needle winding of ESP motors typically cannot achieve a gross fill factor of more than about 55%, or a pure copper fill factor of more than about 45%.

Embodiments disclosed herein use a new stator lamination design and winding process which can achieve a copper fill factor of up to about 75%. This will normally provide at least 25%, and up to 50% greater power density for the same maximum temperature of the windings.

SUMMARY OF THE INVENTION

This disclosure is directed to systems and methods for manufacturing stators for downhole ESP motors. The disclosed manufacturing techniques involve splitting stator laminations into inner and outer portions, where the inner portion includes teeth that form the stator slots, and the outer portion forms the back iron of the stator core. The inner laminations are stacked onto a mandrel and are compressed to form the inner portion of the stator core. The stack of inner laminations may also be referred to as a stator slot stack. Slot liners are positioned in the slots in the stator slot stack, and magnet wires (in some cases shaped wires) are positioned within the slot liners in the slots. The magnet wires are laid into the slots, rather than being pulled through the slots, so that the wires are not dragged across each other. If the coils of magnet wire occupy adjacent slots, it may be possible to pre-form the coils in open space and then position the preformed coils in the slots. If the coils of magnet wire cross over the adjacent slots, the coils are wound directly onto the stator slot stack, which may require specialized equipment as described in more detail below. After the coils of magnet wire have been installed in the slots of the stator slot stack, the back iron formed by the outer laminations are slid in short blocks (e.g., 5-inch stacks) onto the stator slot stack with the already-installed coils of magnet wire. In some embodiments, multiple pre-compressed stacks of the outer laminations are separately pressed onto the stator slot stack.

One embodiment comprises a method for manufacturing a stator for an electric submersible pump. In this method, a stator core having an inner portion and an outer portion is formed. The inner portion of the stator core has a plurality of teeth forming slots between them. Each of the slots has a radially-outward-facing opening. The outer portion of the stator core is adapted to fit over the inner portion of the stator core and to thereby close the plurality of slots of the inner portion of the stator core. The method further comprises, prior to mounting the outer portion of the stator core over the inner portion of the stator core, forming a plurality of magnet wire coils on the inner portion of the stator core. Forming the magnet wire coils on the inner portion of the stator core comprises placing the inner portion of the stator core in a stationary position and, for each coil, positioning the magnet wire on the inner portion of the stator core while preventing each winding of the magnet wire from sliding axially with respect to adjacent windings of the magnet wire and, after forming the magnet wire coils on the inner portion of the stator core, mounting the outer portion of the stator core over the inner portion of the stator core and thereby closing the plurality of slots of the inner portion of the stator core.

In some embodiments, positioning the magnet wire on the inner portion of the stator core comprises: dispensing the magnet wire from a tool having a linearly movable dispense point, where the tool moves the dispense point axially in a first direction along the length of a first slot of the plurality of slots and laying the magnet wire into the first slot in a predetermined position within the first slot. The tool thereafter moves the dispense point axially in a second direction opposite the first direction along a length of a second slot and lays the magnet wire in a predetermined position within the second slot. The second slot may be non-adjacent to the first slot.

In some embodiments, the inner portion of the stator core is formed by stacking a plurality of inner stator laminations on a mandrel, compressing the laminations axially, and locking the compressed laminations in place on the mandrel. In some embodiments, placing the inner portion of the stator core in the stationary position comprises mounting the mandrel on a stationary mandrel support. Mounting the outer portion of the stator core over the inner portion of the stator core may be made easier by forming short stacks of the outer laminations (e.g., compressing and gluing together the laminations) and separately pressing the short stacks of laminations onto the inner portion of the stator core.

The inner and outer laminations may be separately formed (e.g., stamped) with tolerances that allow the short stacks of outer laminations to be pressed onto the wound inner portion of the core without requiring too much pressing force, but also providing a tight enough friction fit not to lose the magnetic properties of the stator core. In an alternative embodiment, Each of the inner laminations may be formed simultaneously with one of the outer laminations by stamping the inner lamination and corresponding outer lamination from a thin sheet of metal with a first orientation between them. Then, when the outer laminations are press-fit onto the inner portion of the stator core, the outer laminations are positioned at a second orientation which is rotated by one half of an angular distance between adjacent ones of the slots from the first orientation.

In some embodiments, the magnet wire comprises shaped wire, and the method further comprises positioning the magnet wire on the inner portion of the stator core with a predetermined orientation.

In some embodiments, forming the magnet wire coils on the inner portion of the stator core comprises positioning in each slot an amount of magnet wire that has a gross fill factor of greater than 55% and a pure fill factor of greater than 45%. In some embodiments, forming the magnet wire coils comprises positioning an amount of magnet wire in each slot that has a gross fill factor of greater than 80% and a pure fill factor of greater than 70%.

One alternative embodiment comprises a system for winding magnet wire onto an open slot portion of a stator core for an electric submersible pump. This system comprises a wire source, a linear guide, a base, positionable arm, and a stator support. The base is coupled to the linear guide and is configured to move on a linear path defined by the linear guide. The positionable arm is movably coupled to the base, and has a dispense point at its end which is configured to receive magnet wire from the wire source and to dispense the wire into open slots of a stator core. The stator support is configured to support the stator core in a position in which an axis of the stator core is substantially parallel to the linear path of the linear guide. The stator support may be configured to hold the stator core in a stationary position as the base and the positionable arm move along the length of the stator core and position the magnet wire in the open slots. The base is configured to move with the positionable arm along the linear path of the linear guide, and the positionable arm is configured to position the dispense point to dispense the magnet wire in the open slots of the stator core without sliding the magnet wire axially. The dispense point positions the magnet wire in the open slots as the base moves the dispense point along the length of the slots.

In some embodiments, the system further comprises a controller coupled to the base and the positionable arm, where the controller is configured to move the base and the positionable arm to cause the dispense point to follow a predetermined path with respect to the open slots and to position the magnet wire in predetermined positions in the open slots. The controller may be configured to position the magnet wire to form distributed turns of the magnet wire (i.e., the coil is installed in non-adjacent ones of the open slots). This may include full pitch or short pitch windings. The magnet wire may have a shaped, non-circular cross-section, and the dispense point may be configured to dispense the magnet wire with a predetermined orientation. The wire is tensioned so that it will stay in the desired position within the slots.

Numerous other embodiments are also possible.

Embodiments disclosed herein may provide a number of advantages over prior art systems and methods. For example, these techniques may reduce damage to the magnet wires resulting from friction between the wires during installation in a stator.

It is also easy to install sensors such as fiber optic sensors (which are very fragile) in the open slots without damage to the sensors that may occur when attempting to install the sensors in a closed slot.

These techniques may also increase the fill factor (wire count and pure copper fill factors) that can be achieved in the stator.

Further, the present techniques may enable known/predetermined positioning of the wires (including shaped wires) within the stator slots (which may be shaped or rectangular), which may increase fill factors, reduce free space between wires in the stator, and prevent highest voltage and lowest voltage wires from being positioned next to each other (reducing electrical stress between the conductors).

The disclosed techniques may also reduce the difficulty and cost of manufacturing the stator, particularly in the case of stators having a diameter of less than 4 inches.

These techniques may also improve the heat dissipation from the wires and reduce the temperature rise in the stator for the same power in a conventionally manufactured device (or increase the power rating for the same temperature rise in the conventionally manufactured stator).

The disclosed techniques may also enable power density to be increased at a reasonable cost through the use of different materials for the inner and outer laminations. For instance, the inner laminations (which use less material than the outer laminations) can be made of a material such as Hiperco® 50 which is more costly (30 times more expensive than silicon steel), but has a higher magnetic permeability to saturate at 2.3 Tesla, versus 1.7 Tesla for regular silicon steel.

Still other advantages may be apparent to those of skill in the art.

BRIEF DESCRIPTION OF THE DRAWINGS

Other objects and advantages of the invention may become apparent upon reading the following detailed description and upon reference to the accompanying drawings.

Figure 1A:
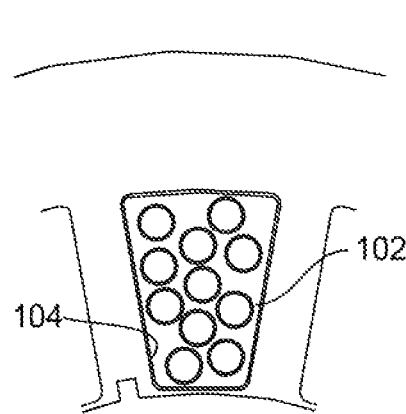
FIGS. 1A-1D are a set of diagrams illustrating examples of different windings of magnet wire in slots of a stator core.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as described herein. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

This disclosure is directed to systems and methods for manufacturing stators for downhole ESP motors, where a stator core is formed with an inner portion and an outer portion. The inner portion includes teeth that form the stator slots, and coils of magnet wire are installed on the inner portion of the core so that the slots of the stator are open. In some embodiments, a linearly movable robotic winding system moves along the length of each slot and positions the wire in the slot without dragging the wires against each other. After the coils of wire are installed, the outer portion of the stator that forms the back iron is pressed onto the inner portion of the stator core which has the installed coils of magnet wire. This effectively closes the stator slots. The laminations that form the outer portion of the stator core may be pre-compressed in multiple small stacks which are separately pressed onto the inner portion of the core.

ESP motors can be very long. Some motors, for example, may be up to 30 feet long. It is typically desirable for these motors to have closed slots (which are effectively long, narrow passageways which extend axially through the stator) for a number of reasons. For example, closed slot designs can have a smoother stator inner surface so that the motor has much less friction loss due to the motor oil inside the motor when the motor is spinning at high speed. Additionally, closed slots allow easier manufacturing, as open slots require a wedge to be inserted in the top of each slot top to reduce the friction loss, which for a long motor is difficult to do. Still further, motors are commonly epoxied to keep the magnet wires in position and to improve heat dissipation, and open slot stator designs allow the epoxy to leak from the slots, which causes manufacturing challenges.

"Axially" is used herein to refer to a direction which is parallel to a bore through the center of the stator. The rotor of the motor will be installed in the stator's bore, where it will be driven by magnetic fields of the stator to rotate, so the axial direction is also the axis of rotation of the rotor.

Thus, conventional stator manufacturing techniques involve winding magnet wires into these closed stator slots. This is very difficult, especially when the stator slots are 30 feet long, because of friction between the wires. Pulling the wires through the slots is particularly difficult for the last one or two windings into the slot, because there is little remaining space in the slot, so there is typically even more friction between the wires.

Another problem with the conventional winding technique of pulling the magnet wires through the slots is that the positioning of the wires within the closed slot is very difficult (if not impossible) to control. The wires may also cross over each other, which reduces the number of wires that can fit in the slot. Consequently, the wires may not be optimally positioned to achieve the highest fill factor. As a result, both machine winding and manual needle winding usually cannot achieve a gross fill factor of more than about 55% (with a pure copper fill factor of no more than about 45%).

Square and rectangular magnet wires can be used to achieve a higher fill factor, but these have a number of associated problems. For example, because the shaped wires are used specifically because they reduce the free space between wires, they also have the problem of having greater contact surface between the wires. This increases friction between the wires, which makes them much more difficult to pull through the slots without damaging the wires. Further, as noted above, the specific positions of the individual wires within the long stator slots cannot be controlled and are therefore somewhat random. Shaped wires can also be twisted within the slot, which prevents the wires from being closely packed and therefore defeats the purposes of the shaped wires. More specifically, the space between the wires reduces the fill factor (i.e., reduces the percentage of the space filled by the wires) and reduces the thermal conductivity within the slot. Although the free space between the wires can be filled with epoxy, the thermal conductivity of the epoxy (typically 0.6 W/mK) is lower than copper (385 W/mK), so the heat generated in the windings is not as easily dissipated.

Another problem with conventionally wound stators is that, since the positioning of the wires within the slots are random, the wires having the highest and lowest voltages within a spot can touch each other. Although the wires are insulated, this can present a very high electrical stress between the conductors with the highest and lowest voltages. This electrical stress between the highest and lowest voltage conductors is the limiting factor for increasing the voltage level of the ESP motor. It should also be noted that the reduced electrical stress between the conductors with the highest and lowest voltages, as well as eliminating the friction from pulling the wires through the slots allows thinner electrical insulation to be used on the wires. The thinner insulation then allows more copper to be placed in the slot, resulting in a higher pure copper fill factor.

It would therefore be desirable to provide systems and methods for manufacturing ESP motors that allow the positioning of wires within the stator slots to be controlled in order to reduce free space between wires, prevent damage to the wires during installation, increase the thermal conductivity of the coils within the slots, and reduce stress between conductors to allow higher operating voltages and/or reduced thickness of the electrical insulation.

Referring to FIGS. 1A-1D, a set of diagrams illustrating different windings of magnet wire in slots of a stator core are shown. Each of these figures shows a cross-sectional view of a single closed slot of a stator having a plurality of wires installed therein.

FIG. 1A depicts a first case in which a set of round wires (e.g., 102) are pulled through closed slot. The wires in this example are turns of AWG 9 copper magnet wire having a diameter of 0.1144 inches. The wire has approximately 6 mil thick insulation, and a 9 mil thick slot liner 104 is positioned against the walls of the slot. Typically, no more than about 11 turns of wire can be pulled through the slot. This results in a wire fill factor (gross fill factor) of about 49%, and a pure copper fill factor of about 40%.

Figure 1B:
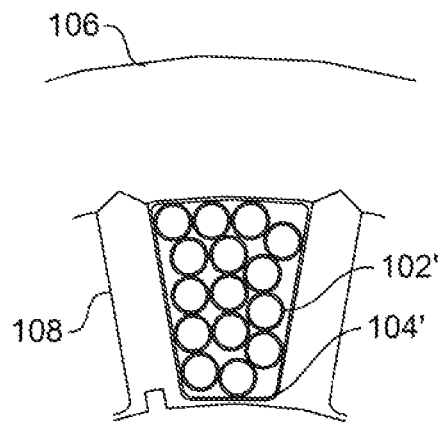

FIG. 1B depicts a second case in which the same type of wire 102' (AWG 9 copper magnet wire having a diameter of 0.1144 inches and 6 mil thick insulation) is installed in a stator slot of the same size. Again, a 9 mil thick slot liner 104' is positioned in the slot. in this case, the magnet wire is wound on the stator core while the slot is open. In other words, the magnet wire is wound onto the inner portion 108 of the stator core before the outer portion 106 of the stator core (the back iron) has been installed. Thus, the wire does not have to be pulled through a closed slot, and the wire insulation is much less likely to be damaged by friction between adjacent wires. Additionally, the winding of the magnet wire in the open slot allows additional turns of wire to be positioned in the slot. In this example, 15 turns of wire have been installed in the slot. This results in a gross fill factor of about 62% and a pure copper fill factor of about 51%.

Figure 1C:
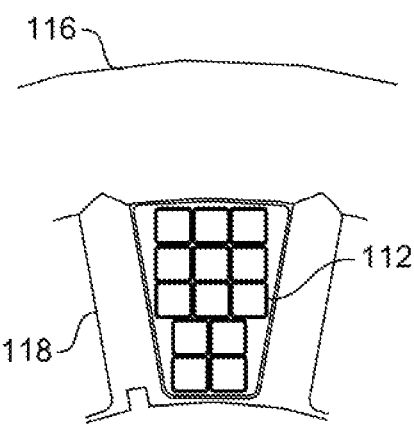

FIG. 1C depicts a third case in which a set of square shaped wires (e.g., 112) are installed in the slot. The wires have a cross-section of 0.1144"×0.144" and have a layer of approximately 3.6 mil thick insulation. A 9 mil thick slot liner is positioned against the walls of the slot. The slot itself has the same trapezoidal shape as in the examples of FIGS.

1A and 1B. As in the case of FIG. 1B, the square wires are wound in the open slot on the inner portion 118 of the stator core prior to installation of outer portion 116, so the wires do not have to be pulled through a closed slot. 13 turns of the square wire can be installed in the slot. The total cross-sectional area of the wires is 0.1756 square inches (with a copper cross-sectional area of 0.1502 square inches), and the slot has an area of 0.2824 square inches, so the gross fill factor is about 62%, and the pure copper fill factor is about 53%.

Figure 1D:
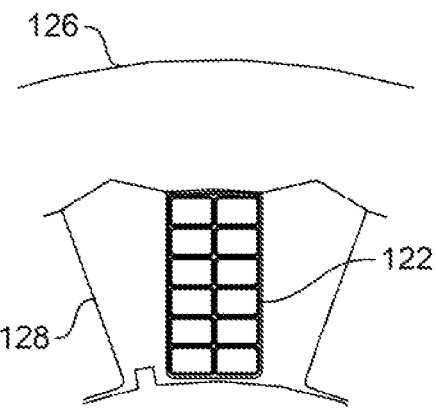

FIG. 1D depicts a fourth case in which a set of rectangular shaped wires (e.g. 122) are installed in a rectangular slot. The wire is 0.148"×0.0947" in cross-section, with 3.6 mil thick insulation. Again, a 9 mil thick slot liner is used. The shaped wire is wound on the inner portion 128 of the stator core prior to installation of the outer portion 126 of the stator core. This allows the slot to be substantially completely filled by the shaped wire. In this example, 12 turns of the rectangular wire can be installed in the slot, providing 0.2024 square inches of cross-sectional are of the wires (0.1666 square inches of copper cross-section) in a slot area of 0.2272 square inches. This provides a gross fill factor of about 89%, and a pure copper fill factor of about 73%.

It can be seen from these examples that the use of a two-piece stator core which allows the magnet wire to be positioned in the open slots of the inner portion of the core prior to installation of the outer portion of the core (which effectively closes the slots) enables a much greater fill factor to be achieved than if conventional techniques for pulling magnet wires through closed slots are used. Depending upon the type of wire and the configuration of the slots, gross and pure copper fill factors can be increased over conventional closed-slot techniques by more than 25% for round wire in a trapezoidal slot, and by more than 80% for rectangular wire in a rectangular slot. Gross fill factors of approximately 65% to 89% and pure copper fill factors of approximately 54% to 73% can be achieved, as compared to a gross fill factor of approximately 48% and a pure copper fill factor of approximately 39% for the conventional closed-slot techniques.

Figure 2A:
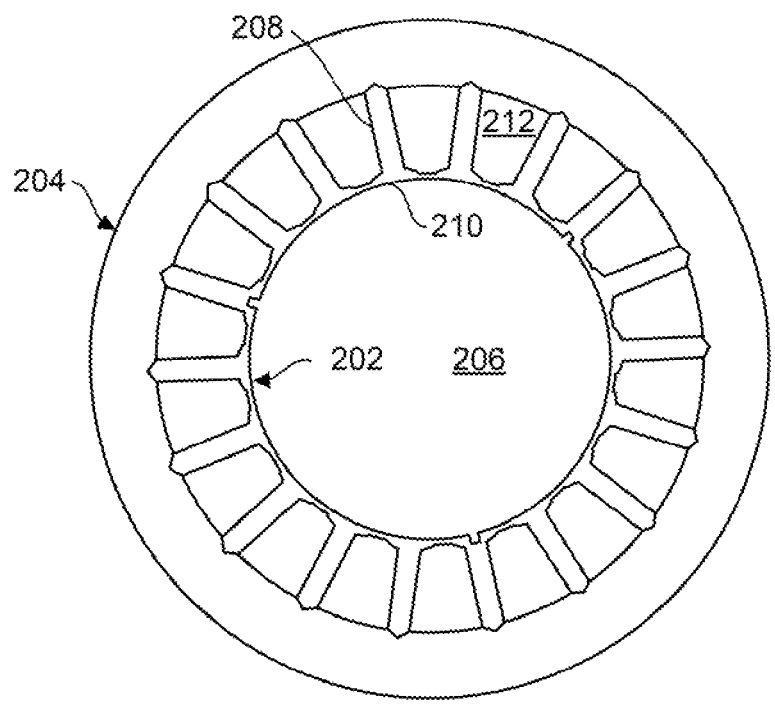
FIGS. 2A-2C are diagrams illustrating examples of the shapes of inner and outer laminations that can be stamped from a sheet of metal in accordance with some embodiments.

Some embodiments of the stator core may be constructed using a laminated structure in which thin sheets of metal are stamped in the shape of the respective inner and outer stator core cross-sections, and the laminations are stacked together to form the respective portions of the stator core. Referring to FIG. 2A, an example of the shapes of the inner and outer laminations is shown. In this example, an inner lamination 202 and corresponding outer lamination 204 can be stamped from a sheet of metal. Inner lamination 202 has a plurality of teeth (e.g., 208 which extend radially outward from a central ring 210. A slot (e.g., 212) is formed between each pair of adjacent teeth. A central bore 206 is formed at the center of inner lamination 202.

"Radially outward" is used to refer to a direction pointing outward from the center of bore 206. Conversely, "radially inward" would refer to a direction pointing toward the center of bore 206. "Outward facing" refers to a direction that is radially outward. For example, the openings of the slots on the inner lamination are outward facing.

Each of the inner laminations 202 and outer laminations 204 is formed with tolerances that provide a secure fit between the inner and outer laminations. The fit is loose enough that a stack of the outer laminations can be pressed onto the stack of inner laminations without requiring too much force, but is also tight enough that the stack of outer laminations is securely positioned on the stack of inner laminations and does not significantly impede magnetic flux between the inner and outer laminations.

Figure 2B:
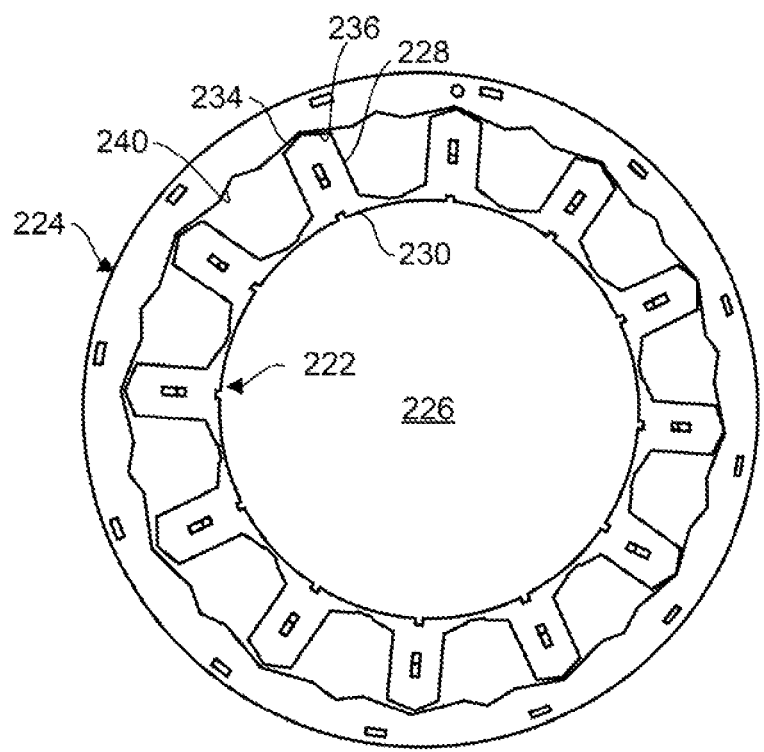

In an alternative embodiment, depicted in FIG. 2B, an inner lamination 222 and corresponding outer lamination 224 can be stamped at the same time from a single sheet of metal. Inner lamination 222 has a plurality of teeth (e.g., 228) extending radially outward from central ring 230, forming slots (e.g., 232) between them. Inner lamination 202 has a central bore 226 at its center. In this embodiment, the tip (e.g., 234) of each tooth (e.g., 228) on inner lamination 222 is chevron-shaped, and outer lamination 224 has a corresponding and complementary chevron shape 236. When the inner and outer laminations are stamped, there is a slight gap 238 between the complementary chevron shapes, so the laminations can be easily separated from each other. Outer lamination 224 also has a second set of chevron shapes (e.g., 240) which are slightly closer to the center of the bore. Thus, when the outer lamination is rotated by one half of the angular distance between slots (or teeth), the second chevron shapes (rather than the first chevron shapes) will be aligned with the tips of the teeth, providing a tight friction fit against the tips of the teeth.

Figure 2C:
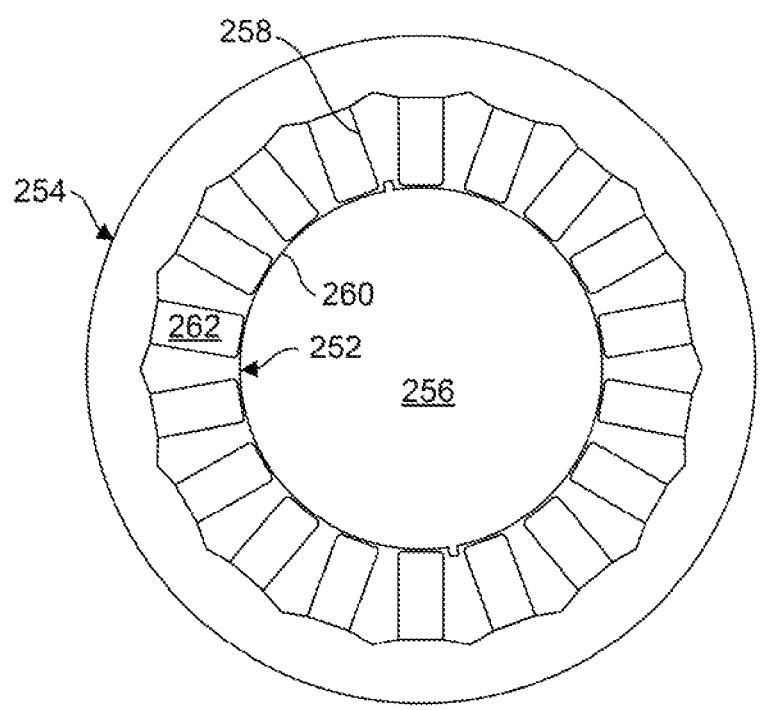

Another alternative embodiment is depicted in FIG. 2C. In this embodiment, inner and outer laminations are again formed. from a sheet of metal. Inner lamination 252 has a plurality of teeth (e.g., 258 which extend radially outward from a central ring 260 that forms a central bore 256. A slot (e.g., 262) is formed between each pair of adjacent teeth. In this embodiment, the teeth are somewhat wedge shaped, so that the slots are rectangular. Each of the inner laminations 202 and outer laminations 204 is formed with tolerances that provide a secure fit between the inner and outer laminations while still allowing a stack of the outer laminations to be pressed onto the stack of inner laminations without too much force.

Figure 3:
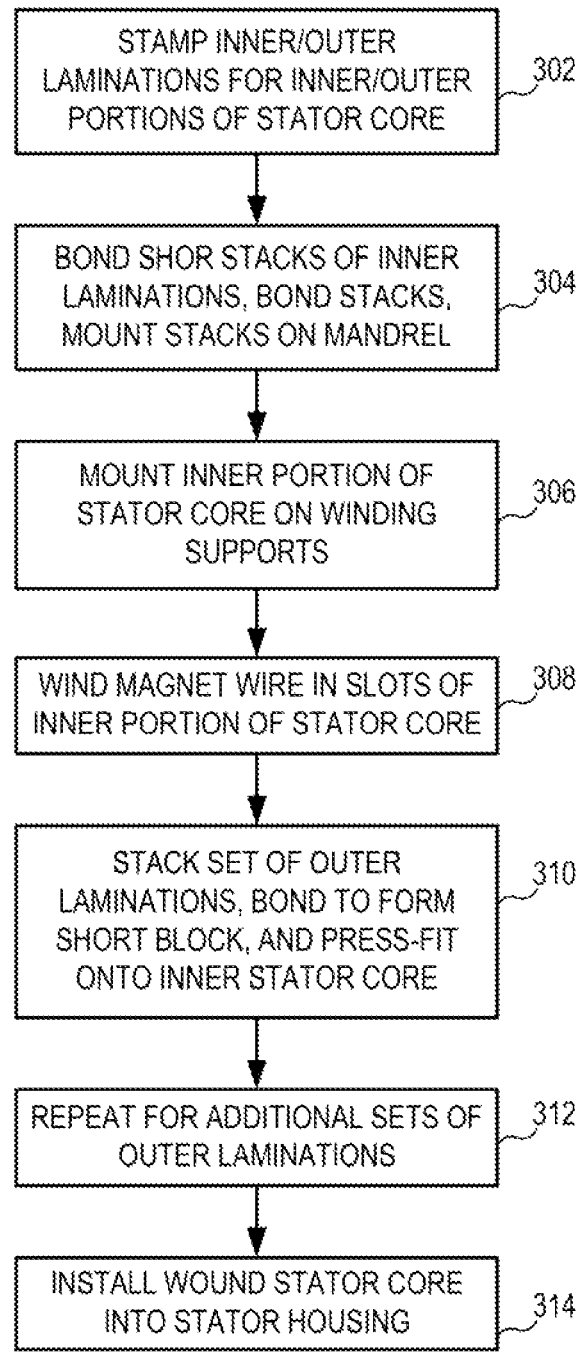
FIG. 3 is a flow diagram illustrating an exemplary method for assembling and winding a stator in accordance with some embodiments.

After the inner and outer laminations have been stamped, short stacks of the laminations can be bonded together to form short blocks, then the inner portion of the stator core can be assembled from the stacks of inner laminations and wound. The stacks of outer laminations are then installed on the wound inner portion of the core. Referring to FIG. 3, a flow diagram illustrating an exemplary method for assembling and winding the stator in accordance with some embodiments is shown. In this method, the inner and outer laminations are formed by stamping the inner and outer laminations from the A thin sheet of metal (step 302). In some embodiments, the inner and outer laminations are separately stamped, while in other embodiments they may be simultaneously stamped out of the same metal sheet.

In this embodiment, short stacks of the inner laminations are stacked and bonded (e.g., glued or interlocking) together to form short blocks which are then mounted on the mandrel. The blocks are compressed and locked when they are mounted on the mandrel. The inner laminations are mounted on a mandrel (step 304) to form a substantially smooth, straight central bore. The laminations have keyways that are aligned with complementary keys on the mandrel in order to ensure that the teeth and slots of each lamination are aligned to form straight slots along the length of the stack. In alternative embodiments, dimples formed in the stamped laminations or other indexing means can be used to facilitate their alignment. The stack of laminations is then compressed on the mandrel and secured to lock the laminations into position.

The inner portion of the stator core formed by the laminations stacked on the mandrel is positioned on a winding support structure (step 306). The support structure holds the inner portion of the stator core in a stable position. In some embodiments, the inner portion of the stator core is held in a generally horizontal position (with the axis through the central bore of the stator generally parallel to the ground), although it may be oriented differently in alternative embodiments. The support structure may provide a seat in which each end of the mandrel can rest, as well as intermediate supports which prevent the stator core from bowing (bending) due to gravity, since the stator core may be 20 or 30 feet long. The support structure holds the inner portion of the stator core in a substantially stationary position.

Magnet wire is then positioned in the open slots of the inner portion of the stator core (step 308). Conventional winding techniques are typically used to build stators that are relatively short (e.g., less than 5 feet). Because these stators are relatively short, it is possible to rotate the stator end-to-end and to thereby wind wire from a spool at a substantially stationary position onto the stator. Because of the length of ESP motors (e.g., 20-30 feet), it is impractical to attempt to use this process. The present embodiments therefore use a linearly movable winding tool which is designed to travel along the length of the stator, and to lay the magnet wire into each slot as the winding tool moves along the slot. The general structure and operation of the tools are described in more detail below.

The linearly movable winding tool is configured to dispense the magnet wire at a point which can be moved down the slot, laying the wire into the slot, rather than pulling the wire through the slot. The dispense point may, for example, be at the end of a robotically controlled arm that can be very accurately positioned as it moves along the length of the slot. Consequently, the magnet wire can also be accurately positioned within the slot, rather than being randomly positioned, which is the case when wire is pulled through a slot using conventional techniques. The robotically controlled dispense point may also accurately control the orientation of shaped wires, preventing the wires from twisting within the slots. This can prevent unwanted free space between adjacent wires.

After the winding process has been completed and magnet wires have been installed in each of the stator slots, the outer portion of the stator core can be installed over the inner portion to enclose the slots. In some embodiments, the outer portion of the stator core is installed in sections where, for each section, a set of outer laminations is stacked, compressed, and then pressed onto the stacked inner laminations on the mandrel (step 310). In one embodiment, each stack of outer laminations is approximately five inches (axially), and the stack is glued together so that the stack can be pressed onto the inner portion of the stator as a unit. The length of the outer lamination stack may vary, with shorter stacks requiring less force to press them onto the inner portion of the stator, and longer stacks requiring more force. This process is repeated until all of the outer laminations have been installed on the wound inner portion of the stator core (step 312). The assembled, wound stator core can then be installed in a stator housing (step 314).

Figure 4:
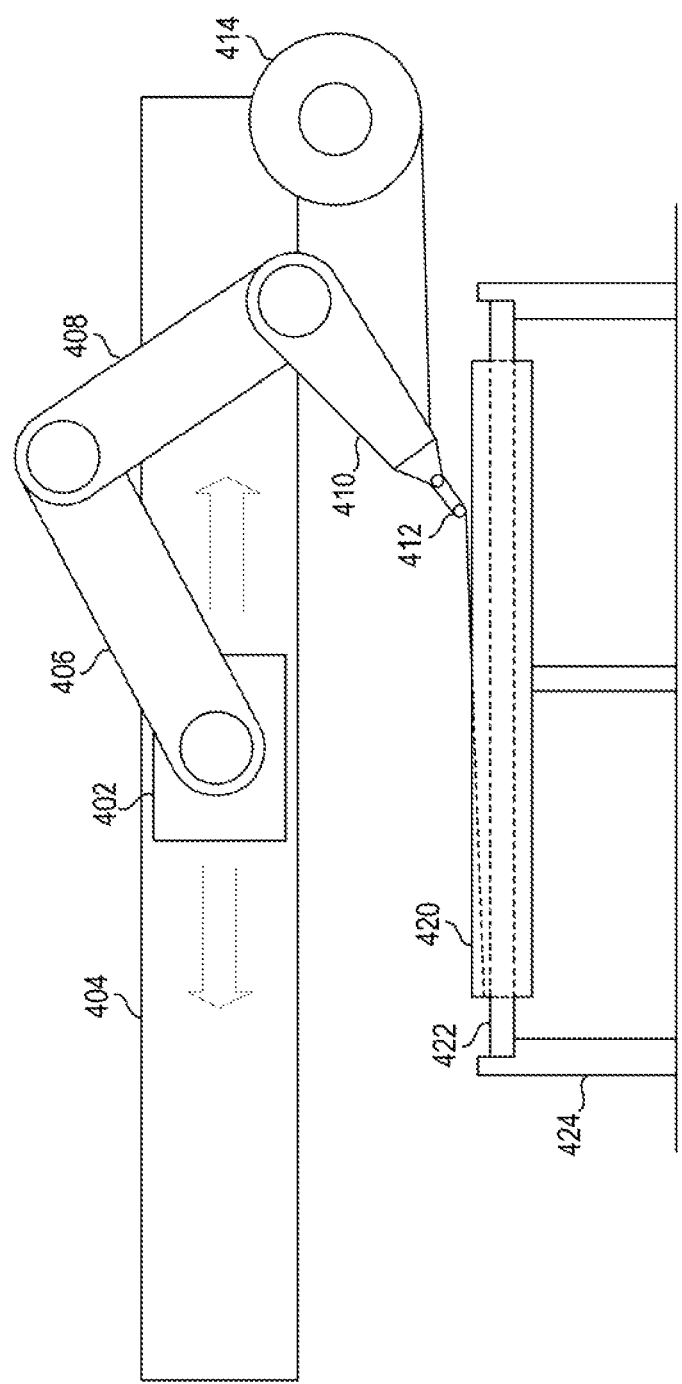
FIG. 4 is a diagram illustrating the general structure of an exemplary stator winding tool in accordance with some embodiments.

As noted above, the magnet wire is wound onto the inner portion of the stator core in some embodiments by a winding tool having a robotically controlled arm. The general structure of an exemplary winding tool is illustrated in FIG. 4. In this embodiment, a linearly movable base 402 for the tool is mounted on a linear guide 404. Linear guide 404 provides a track on which base 402 can move during the winding process. The track of linear guide 404 is generally parallel to the axis of the inner stator core to facilitate movement of the winding tool along the length of the slots of the stator core.

A robot arm having articulated sections 406, 408, 410 is mounted on base 406. These sections enable the robot arm to position a dispense point 412 at the end of articulated section 410.

As noted above, the inner portion 420 of the stator core is placed in a stationary position. In this figure, the stator core is mounted on supports 424, which may include end supports to hold mandrel 422 at the ends of the stator core, as well as intermediate supports which prevent the stator core from sagging or bowing due to its length.

A spool 414 of wire is coupled to the winding tool, and the wire from the spool is provided to the robotic arm, where it is dispensed from dispense point 412. A brake or tensioner (not explicitly shown in the figure) is coupled to spool 414 in order apply tension to the wire as it is dispensed. This allows the wire to be tensioned and straightened as it is positioned in the slots. The tensioning of the wire also ensures that there is no twisting or bending of the wires that might otherwise prevent the desired fill factor from being achieved when the wires are laid into slots.

The robotic arm is programmed to move dispense point 412 along the length of stator core 420, dispensing the magnet wire into the slots of the stator core as it moves linearly along the length of the stator core. More specifically, the robotic arm starts at one end of a first slot and moves down the length of the first slot, dispensing magnet wire into the first slot as it moves. The dispensed wire is not dragged along the slot, but is instead laid into the slot. In other words, the wire is positioned in the slot without moving the wire axially. Thus, the wire is positioned against other wires that have already been installed in the slot without sliding the wires against each other. The tool thereby reduces or eliminates damage to the wire insulation that is typically caused by friction between the wires when using conventional winding techniques.

After the winding tool has positioned wire within the first slot (moving from one end, along the entire length of the slot to the other end) the winding tool moves the dispense point to a second slot. The tool then continues, dispensing wire from the dispense point into the second slot. When the tool has positioned the wire along the entire length of the second slot (from the second end pack to the first end), a single turn of the coil of wire has been installed in the two slots. This process is repeated until the desired number of turns of the coil have been positioned in the slots. The tool repeats this procedure for each subsequent pair of slots until coils of magnet wire have been installed in each of the slots of the inner portion of the stator core.

It should be noted that the robotic arm can be programmed to position the dispense point with a desired degree of accuracy, thereby enabling the positioning of the magnet wires as desired within the stator slots. As noted above in connection with FIGS. 1A-1D (especially FIGS. 1C-1D), shaped wires (e.g., square or rectangular wires) can therefore be placed in desired positions within the slots. Additionally, the orientation of shaped wires can be maintained as the wire is dispensed from the dispense point. This can enable placement of the magnet wires so that the wires substantially fill the space within the slots as in FIG. 1D. This increases the fill factor of the wire in the slots. The ability to specifically place the magnet wire in specific, predetermined positions also enables winding the stator so that the highest-voltage turn of wire is not adjacent to the lowest-voltage turn of wire. This reduces the electrical stress between the magnet wires.

Figure 5A:
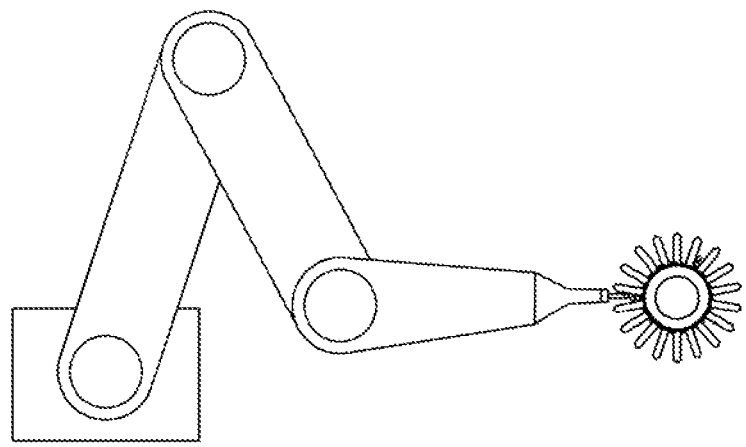
FIGS. 5A-5B are diagrams illustrating the positioning of a dispense point of a robotic arm during the winding of a coil of magnet wire on a stator core in accordance with some embodiments.
Figure 5B:
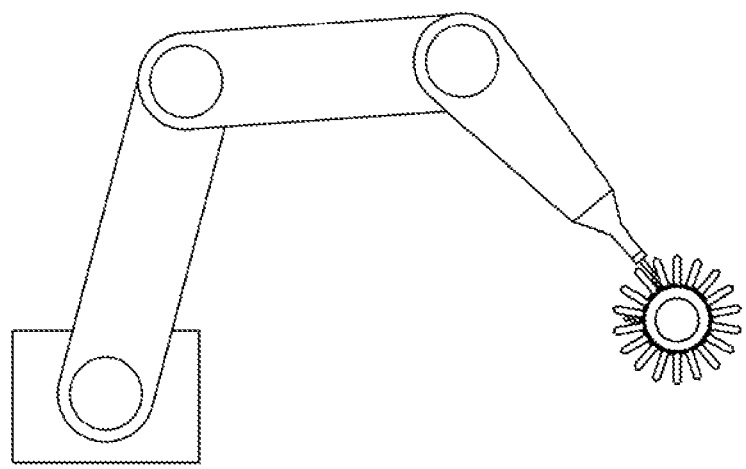

Referring to FIGS. 5A and 5B, a pair of diagrams illustrating the positioning of the dispense point of the robotic arm during the winding of a coil of magnet wire is shown. FIG. 5A depicts the robotic arm positioned with the dispense point in a first slot of the inner portion of the stator core. The robotic arm maintains this position, placing magnet wire in the first slot as the base of the robotic arm moves along the length of the stator core (into the page). When the robotic arm reaches the end of the stator core, it moves the dispense point to a second slot and maintains this position as the base moves the robotic arm in the opposite direction (out of the page). This process is repeated until the desired turns of magnet wire have been positioned within the first and second slots. The robotic arm then moves to a different pair of slots and repeats this procedure until the desired turns magnet wire have been installed in the slots as well. This continues until coils of magnet wire have been installed in all of the slots of the inner portion of the stator core. In some cases, it may be desirable after winding coils in a first set of slots to rotate the inner portion of the stator core (around the axis through the bore) in order to facilitate access to other slots in which coils have not yet been installed.

It should be noted that, although the inner portion of the stator core is maintained in a stationary position in the examples described above, alternative embodiments may allow the stator core to be rotated (around the axis of the stator bore) to facilitate positioning of the dispense point within the desired slots.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the description herein.

What is claimed is:

1. A method for manufacturing a stator for an electric submersible pump, the method comprising:
    forming a stator core having an inner portion and an outer portion, the inner portion of the stator core having a plurality of teeth forming a plurality of slots therebetween, each of the slots having a radially-outward-facing opening, the outer portion of the stator core being adapted to fit over the inner portion of the stator core and to thereby close the plurality of slots of the inner portion of the stator core;
    prior to mounting the outer portion of the stator core over the inner portion of the stator core, forming a plurality of magnet wire coils on the inner portion of the stator core, wherein forming the plurality of magnet wire coils on the inner portion of the stator core comprises placing the inner portion of the stator core in a stationary position, and
        for each coil, positioning the magnet wire on the inner portion of the stator core, wherein the plurality of slots have a predetermined position to receive the magnet wire on the inner portion of the stator core, wherein the predetermined position comprises a position separating a highest voltage turn from a lowest voltage turn of the magnet wire, wherein the positioning comprises dispensing the magnet wire from a tool having a linearly movable dispense point, the tool moving the dispense point axially in a first linear direction along a length of a first slot of the plurality of slots and laying the magnet wire into the first slot in a first predetermined position within the first slot; and the tool thereafter moving the dispense point axially in a second linear direction opposite the first linear direction along a length of a second slot of the plurality of slots and laying the magnet wire into the second slot in a second predetermined position within the second slot; and
    after forming the plurality of magnet wire coils on the inner portion of the stator core, mounting the outer portion of the stator core over the inner portion of the stator core and thereby closing the plurality of slots of the inner portion of the stator core.

2. The method of claim 1, wherein the plurality of magnet wire coils comprise distributed coils in which the second slot is non-adjacent to the first slot.

3. The method of claim 1, further comprising forming the inner portion of the stator core by stacking a plurality of inner stator laminations on a mandrel, compressing the laminations axially and locking the compressed laminations in place on the mandrel.

4. The method of claim 3, wherein placing the inner portion of the stator core in the stationary position comprises mounting the mandrel on a stationary mandrel support.

5. The method of claim 3, wherein mounting the outer portion of the stator core over the inner portion of the stator core comprises, for each of a plurality of stacks of outer laminations, compressing the stack of outer laminations and pressing the compressed stack of outer laminations onto the inner portion of the stator core.

6. The method of claim 1, wherein the magnet wire comprises shaped wire, the method further comprising positioning the magnet wire on the inner portion of the stator core with a predetermined orientation.

7. The method of claim 6, wherein the shaped wire comprises wire having a rectangular cross-section, and wherein the shaped wire is installed in rectangular shaped slots.

8. A method for manufacturing a stator for an electric submersible pump, the method comprising:
    forming a stator core having an inner portion and an outer portion, the inner portion of the stator core having a plurality of teeth forming a plurality of slots therebetween, each of the slots having a radially-outward-facing opening, the outer portion of the stator core being adapted to fit over the inner portion of the stator core and to thereby close the plurality of slots of the inner portion of the stator core;
    prior to mounting the outer portion of the stator core over the inner portion of the stator core, forming a plurality of magnet wire coils on the inner portion of the stator core, wherein forming the plurality of magnet wire coils on the inner portion of the stator core comprises placing the inner portion of the stator core in a stationary position, and for each coil, positioning the magnet wire on the inner portion of the stator core; and after forming the plurality of magnet wire coils on the inner portion of the stator core, mounting the outer portion of the stator core over the inner portion of the stator core and thereby closing the plurality of slots of the inner portion of the stator core, wherein forming the plurality of magnet wire coils on the inner portion of the stator core comprises positioning in each slot an amount of magnet wire that has a gross fill factor of greater than 60% and a pure fill factor of greater than 50%.

9. A method for manufacturing a stator for an electric submersible pump, the method comprising:

forming a stator core having an inner portion and an outer portion, the inner portion of the stator core having a plurality of teeth forming a plurality of slots therebetween, each of the slots having a radially-outward-facing opening, the outer portion of the stator core being adapted to fit over the inner portion of the stator core and to thereby close the plurality of slots of the inner portion of the stator core;

prior to mounting the outer portion of the stator core over the inner portion of the stator core, forming a plurality of magnet wire coils on the inner portion of the stator core, wherein forming the plurality of magnet wire coils on the inner portion of the stator core comprises placing the inner portion of the stator core in a stationary position, and for each coil, positioning the magnet wire on the inner portion of the stator core; and after forming the plurality of magnet wire coils on the inner portion of the stator core, mounting the outer portion of the stator core over the inner portion of the stator core and thereby closing the plurality of slots of the inner portion of the stator core, wherein forming the plurality of magnet wire coils on the inner portion of the stator core comprises positioning in each slot an amount of magnet wire that has a gross fill factor of greater than 70% and a pure fill factor of greater than 60%.

10. The method of claim 1, wherein the tool comprises a robotically controlled arm having a linearly movable base mounted on a linear guide, wherein the base moves on a track that is parallel to an axis of the stator core.

11. The method of claim 10, wherein the robotically controlled arm comprises multiple articulated sections and the dispense point is positioned at an end of one of the articulated sections.

12. The method of claim 11, wherein the tool further comprises a tensioner which applies tension to the magnet wire as the magnet wire is dispensed.

13. The method of claim 11, wherein the articulated sections of the robotically controlled arm are controlled to position the dispense point at a desired position within each slot as the dispense point is moved linearly to dispense the magnet wire within the slot.

14. The method of claim 1, wherein forming the plurality of magnet wire coils on the inner portion of the stator core comprises positioning in each slot an amount of magnet wire that has a gross fill factor of greater than 60% and a pure fill factor of greater than 50%.

15. The method of claim 1, wherein forming the plurality of magnet wire coils on the inner portion of the stator core comprises positioning in each slot an amount of magnet wire that has a gross fill factor of greater than 70% and a pure fill factor of greater than 60%.

* * * * *